United States Patent
Akpinar et al.

(10) Patent No.: US 10,378,907 B1
(45) Date of Patent: Aug. 13, 2019

(54) METHODS AND SYSTEMS FOR DETERMINING VERTICAL LOCATION IN ENCLOSED SPACES

(71) Applicant: Pointr Limited, London (GB)

(72) Inventors: Ismail Ege Akpinar, London (GB); Can Tunca, Istanbul (TR); Sinan Isik, Istanbul (TR); Mehmet Can Akpinar, Istanbul (TR)

(73) Assignee: Pointr Limited, London (GB)

( * ) Notice: Subject to any disclaimer, the term of this patent is extended or adjusted under 35 U.S.C. 154(b) by 0 days.

(21) Appl. No.: 16/196,401

(22) Filed: Nov. 20, 2018

(51) Int. Cl.
| | |
|---|---|
| *G01C 21/00* | (2006.01) |
| *G01C 21/20* | (2006.01) |
| *H04W 4/33* | (2018.01) |
| *G01S 1/04* | (2006.01) |
| *H04W 4/024* | (2018.01) |
| *H04W 4/02* | (2018.01) |

(52) U.S. Cl.
CPC ............ *G01C 21/206* (2013.01); *G01S 1/045* (2013.01); *G01S 1/047* (2013.01); *H04W 4/024* (2018.02); *H04W 4/027* (2013.01); *H04W 4/33* (2018.02)

(58) Field of Classification Search
CPC ...... G01C 21/206; H04W 4/024; H04W 4/33; H04W 4/027; G01S 1/045; G01S 1/047
USPC .......................................................... 702/150
See application file for complete search history.

(56) References Cited

U.S. PATENT DOCUMENTS

| | | | |
|---|---|---|---|
| 9,820,100 B1* | 11/2017 | Jarvis | H04W 4/029 |
| 2012/0203453 A1* | 8/2012 | Lundquist | G01C 21/005 |
| | | | 701/434 |
| 2015/0230055 A1* | 8/2015 | Smith | H04W 4/029 |
| | | | 455/456.3 |
| 2015/0334678 A1* | 11/2015 | MacGougan | G01S 19/22 |
| | | | 701/451 |
| 2016/0014713 A1* | 1/2016 | Kennedy | G01S 5/0242 |
| | | | 455/456.1 |
| 2017/0153110 A1* | 6/2017 | Matsushita | G01C 21/206 |
| 2018/0356492 A1* | 12/2018 | Hamilton | G01S 13/76 |

* cited by examiner

*Primary Examiner* — Yoshihisa Ishizuka
(74) *Attorney, Agent, or Firm* — Dickinson Wright PLLC; Mark E. Scott

(57) ABSTRACT

Determining a vertical location of a hand-held computing device. At least some of the example embodiments are computer-implemented methods including: generating an estimate of expected vertical location based on items of beacon data received from beacons by a radio receiver of the hand-held computing device, generating an error covariance of the estimate of expected vertical location based on the items of beacon data, calculating a level normalized change based on measurements of barometric pressure by a pressure sensor of the hand-held computing device, calculating the vertical location of the hand-held computing device based on the level normalized change, the error covariance of the estimate of expected vertical location, and the estimate of expected vertical location, and activating a relevant map for a level comprising the vertical location and displaying the vertical location on a display device of the hand-held computing device.

16 Claims, 12 Drawing Sheets

METHODS AND SYSTEMS FOR DETERMINING VERTICAL LOCATION IN ENCLOSED SPACES

CROSS-REFERENCE TO RELATED APPLICATIONS

Not Applicable.

BACKGROUND

Outdoor navigation systems designed for vehicles use global positioning system (GPS) signals to find position and find a route to a destination, both of which are expressed and displayed in terms of two-dimensional space. For outdoor navigation applications, determination of a vertical location, such as a level within a building, is unavailable. Further, for most outdoor land navigation, vertical location, such as level within a building, is irrelevant.

However if navigation is to be provided for a pedestrian within a building, requirements different from those present in outdoor navigation will present themselves, and the failure to fulfill these requirements has frustrated attempts to solve problems related to indoor navigation. If they can be accurately determined, floor levels in an indoor navigation system may be used to accurately guide the user from one part of a building on a first floor to a second part of a building on a different floor. Additionally, frequent updates to a vertical level will be needed to track changes in user location between levels.

Most if not all related-art systems suffer from problems of inaccuracy that compromise usability.

One of the common methods is measuring the strength radio signals on a floor level. Such radio signals are broadcast by WI-FI routers, IEEE 802.15.4 Wireless Sensor Networks or any other radio-transmitting device. The accuracy and performance of these signal strength methods are unsatisfactory, and additional problems arise with such techniques in that they will require a network set up in the building. Further some of the radio networks will require radio transmitters to be installed in pre-determined patterns to support floor detection. Such requirements immediately limit the use of radio network based methods to a handful of buildings. For example, these techniques are of limited value in exhibition halls or parking garages that have no permanent WI-FI networks installed.

An alternative, called, "fingerprinting," is labor heavy in that it requires detailed survey of each and every floor. Effectively a 'radio wave fingerprint' of each and every floor is plotted from all possible locations on that floor level. Site survey is a manual process and therefore is costly and time consuming. Another disadvantage of fingerpring systems is that behaviour of transmitters change in a building over time, requiring site survey to be repeated periodically and user systems must be updated with new survey results.

Systems and methods that provide an accurate and updated determination of a vertical level within a building would provide a competitive advantage in the marketplace.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, an application specific integrated circuit (ASIC), a microcontroller with controlling software, a digital signal processor (DSP), a processor with controlling software on memory, a field programmable gate array (FPGA), or combinations thereof, configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

It is noted that the various embodiments were developed in the context of determining vertical location or level within a building of a handheld computing device, such as a mobile phone or mobile computer in indoor navigation circumstances, and thus the description is based on the developmental context; however, indoor navigation is merely an example of a situation where a vertical location, determination may be made, and other uses are possible (e.g., asset tracking, outdoor pedestrian navigation, GPS-based automobile navigation, and aviation navigation). Thus, the developmental context shall not be read a limitation of the various embodiments. The specification now turns to an example environment to help orient the reader.

Figure 1A:
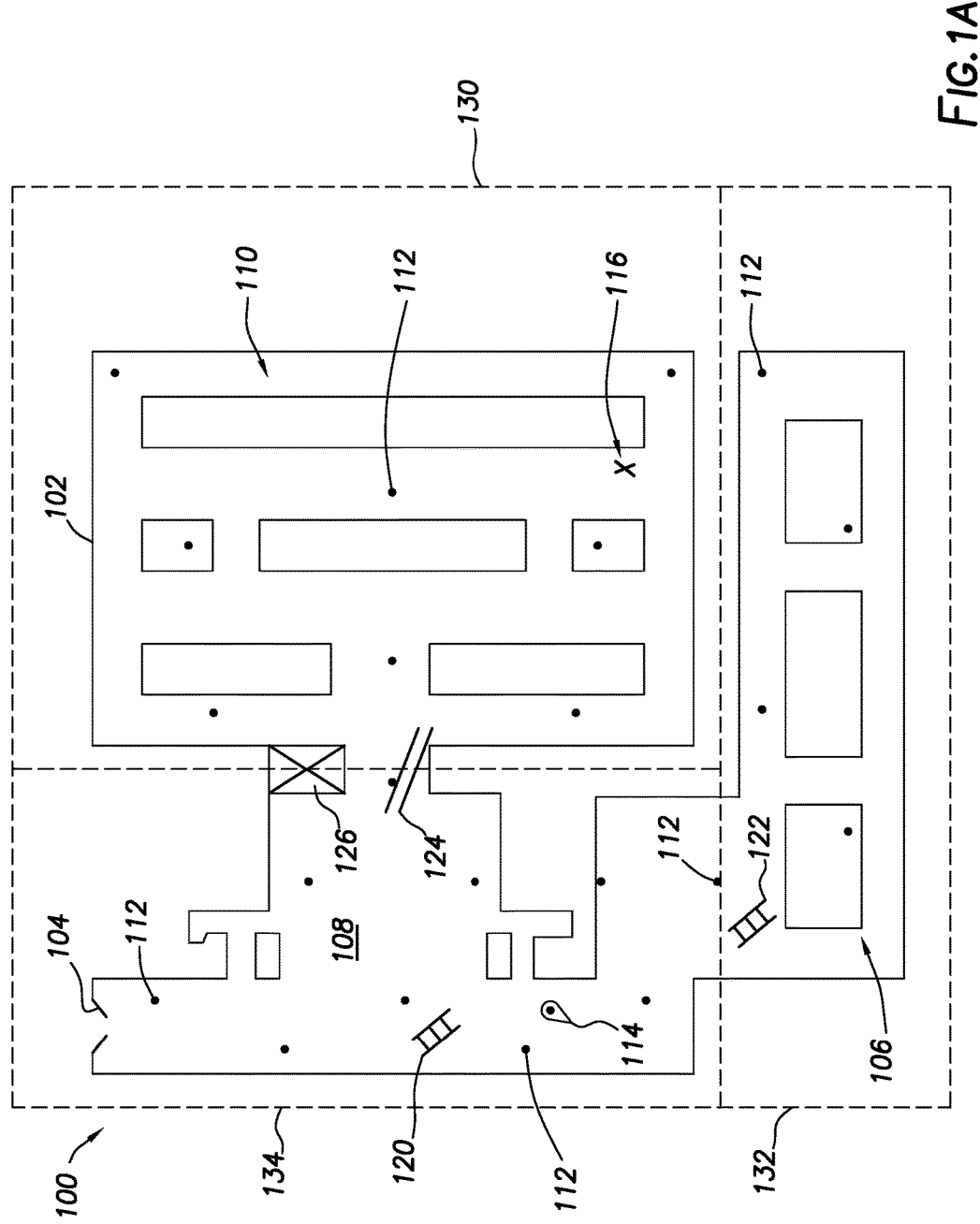
FIG. 1A shows an overhead view of a single floor of an indoor venue in accordance with at least some embodiments.

FIG. 1A shows an overhead view of an indoor venue in accordance with at least some embodiments. In particular, FIG. 1 shows the layout 100 of an example indoor venue 102. A person may enter the indoor venue 102 through doors 104. Once inside, the person may want to navigate from the entry hall area 108 (on second level 134) to the exhibition area 106 (on first level 132) or exhibition area 110 (on third level 130) each of which may be located on a different level within the building, in addition to having a different horizontal location, requiring navigation between them through the use of elevators 126, stairs 120, ramps 124, ladders or escalators 122. Disposed within the indoor venue are a plurality of beacon devices 112. Not all beacon devices are numbered so as not to unduly complicate the figure. The beacon devices 112 may be placed at any suitable location, such as ceiling-mounted beacon devices, wall-mounted beacon devices, beacon devices mounted on structural pillars, and the like. The beacon devices 112 may take any suitable form, such as Bluetooth Low Energy (BLE) devices, or Ultra Wide Band (UWB) devices, available from many manufacturers. Moreover, location determinations may take any suitable form, such as triangulation, received signal strength indications (RSSI), and combinations. The various embodiments of determining initial vertical location be used with any suitable location determination method and system.

Consider a user that has entered the facility, is standing at location 114 in the entry hall 108, and would like to navigate to location 116 within exhibit hall 110. The hand-held computing device or mobile device carried by the user has a navigation program that either knows in advance, or is provided upon request from the beacon devices 112 or a cellular data network, the layout of the indoor venue 102. A purely horizontal navigation path from location 114 to location 116 through exhibition hall 106 may appear possible to a two-dimensional navigation system, but may be impossible in fact, due to the fact that exhibition area 106 is located on second level 132 and exhibition area 110 is located on third level 130. Instead, a horizontal and vertical navigation path from location 114 to location 116 using stairs 120 and one of elevators 126 and ramps 124 is required.

In related-art systems, the navigation platform may unable to determine the level occupied by the user at location 114, in which case the user may be given a wrong navigation path (e.g., towards exhibit hall 106 rather than exhibit hall 110 in this example).

Figure 1B:
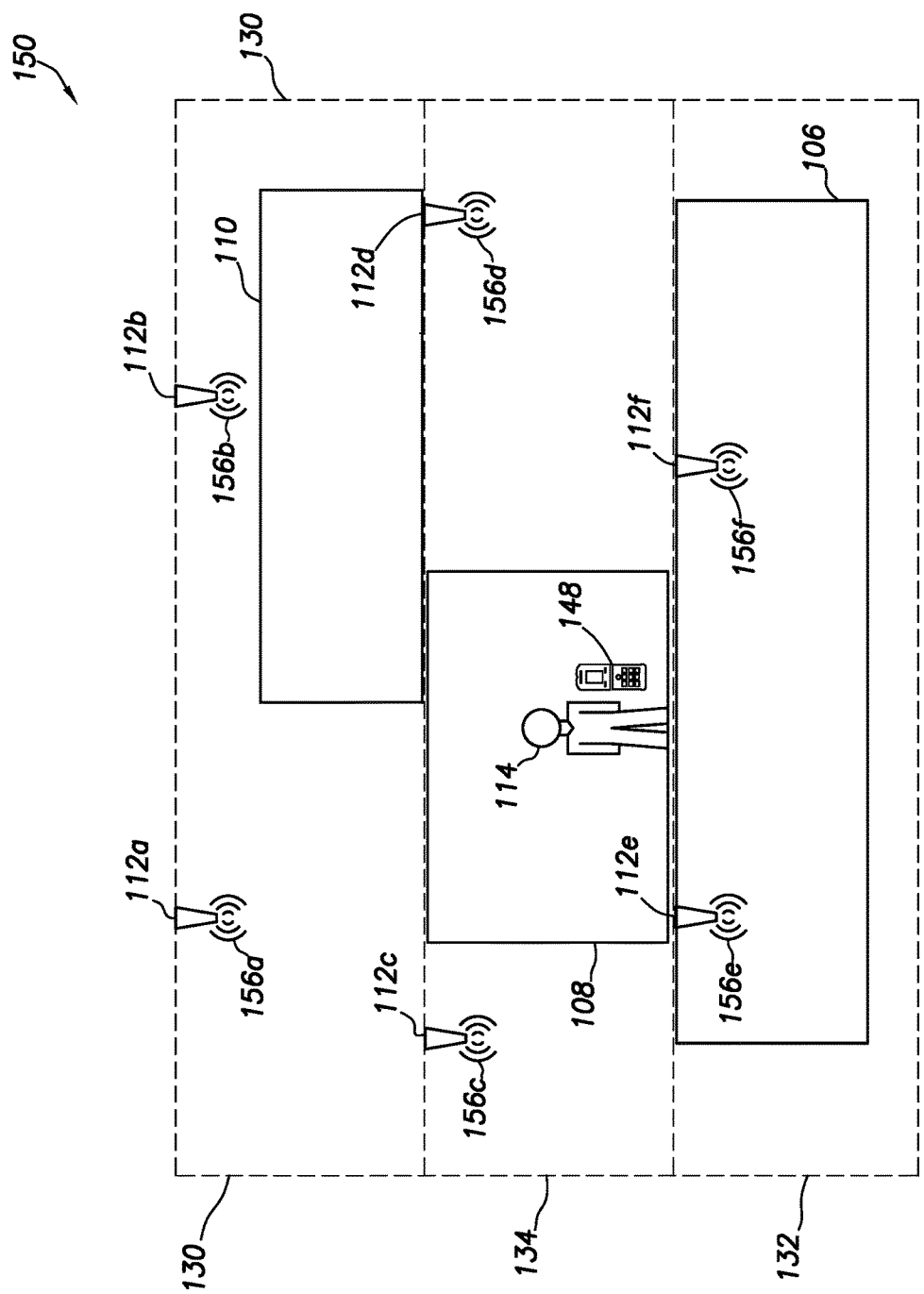
FIG. 1B shows a side view of a multiple floors of an indoor venue in accordance with at least some embodiments.

The problem of indoor navigation without level determination is further illustrated by FIG. 1B. FIG. 1B shows a side view of a multiple floors of an indoor venue in accordance with at least some embodiments. Within a 3-dimensional exhibit space 150, The person at location 114, holding a handheld computing device 148 that interacts with beacons 112a-f by means of radio signals 156a-f may want to navigate from the entry hall area 108 (on second level 134) to the exhibition area 106 (on first level 132) or exhibition area 110 (on third level 130).

Some embodiments support multiple-vertical-level indoor navigation as needed in the example above by determining a vertical location of a hand-held computing device 148 through a method that includes generating an estimate of expected vertical location of the handheld computing device 148 based on items of beacon data (derived from radio signals 156a-f) received from beacons 112a-f by a radio receiver of the hand-held computing device 148. In some embodiments, the method further includes generating an error covariance of the estimate of expected vertical location based on the items of beacon data. In some embodiments, the method further includes calculating a level normalized change based on measurements of barometric pressure by a pressure sensor of the hand-held computing device 148. In some embodiments, the method further includes calculating the vertical location of the hand-held computing device 148 based on the level normalized change, the error covariance of the estimate of expected vertical location, and the estimate of expected vertical location. In some embodiments, the method further includes activating a relevant map for a level comprising the vertical location and displaying the vertical location on a display device of the hand-held computing device 148.

Figure 2:
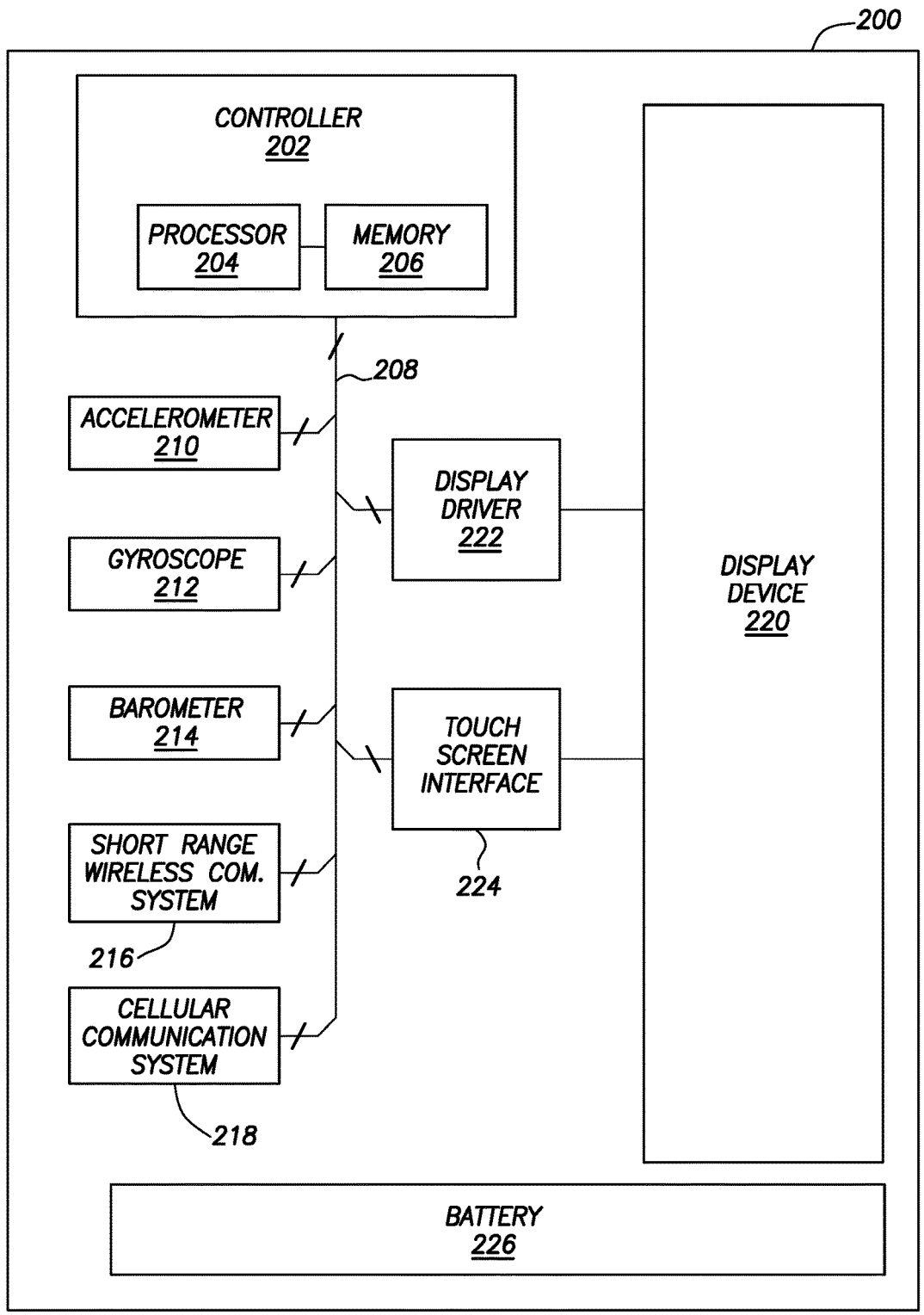
FIG. 2 shows a block diagram of a mobile device in accordance with at least some embodiments.

FIG. 2 shows a block diagram of a mobile device in accordance with at least some embodiments. In particular, FIG. 2 shows example mobile device 200 comprising a controller 202. The controller 202 takes any suitable form, such as an application specific integrated circuit (ASIC), a microcontroller with controlling software, a digital signal processor (DSP), a processor with controlling software, a field programmable gate array (FPGA), or combinations thereof, configured to read inputs and drive outputs responsive to the inputs. In the system of FIG. 2, the controller 202 is implemented in the example form of a processor 204 coupled to a memory 206. The controller 202 couples to host of internal components and devices by any suitable direct connection or bus system, as shown by the example internal bus 208.

The example mobile device 200 comprises an accelerometer 210 electrically coupled to the controller 202 by way of the internal bus 208. The accelerometer 210 may take any suitable form, such as a single-axis accelerometer, or multi-axis accelerometer. In a particular example, the accelerometer 210 is a three-axis accelerometer such that the mobile device 200 may be able to determine acceleration in any dimension (e.g., movement in the horizontal plane or vertical plane. In other cases the accelerometer 210 may be one or more velocity meters, from which acceleration can be mathematically determined. The example mobile device 200 further comprises an electronic gyroscope 212 electrically coupled to the controller 202 by way of the example internal bus 208.

The example mobile device 200 further comprises a barometer 214 electrically coupled to the controller 202 by way of the example internal bus 208. The barometer 214 may be used to read barometric pressure, which is indicative of the elevation and change in elevation. Of course, barometric pressure is also influenced by high and low pressure weather patterns; however, frequent readings of the barometer are much less likely to be influenced by weather, especially when relative elevation changes are used. Further, in some embodiments, the data from the barometer 214 are combined with other data for elevation, vertical position, or level determinations.

The example mobile device 200 further comprises a short-range wireless communication system 216 coupled to the controller 202 by way of the example internal bus 208. The short-range wireless communication system 216 may take any suitable form and protocol, such as Bluetooth, or any or any of the various WIFI protocols, such as IEEE 802.11. In example embodiments, the mobile device 200 receives data from beacon devices 112 (FIG. 1A-B) as part of providing navigation services to the user of the mobile device 200.

The example mobile device 200 further comprises a cellular communication system 218 electrically coupled to the controller by way of the example internal bus 208. The cellular communication system 218 wirelessly communicates with cell towers to provide voice and data services. In example embodiments, internal maps of indoor venues (such as indoor venue 102 (FIG. 1A-1B)) may be downloaded using the data aspects of the cellular communication system 218. The maps may also be downloaded by use of the short-range wireless communication system 216 in addition to, or in place of, the cellular communication system 218.

The example mobile device 200 further comprises a display device 220 electrically coupled to the controller 202 by way of display driver 222. As the name implies, the display driver 222 takes data provided by the controller 202 (e.g., maps, graphical indications of direction to travel) and displays the information on the display device 220 for the user. In some example systems, the display device 220 is covered by or integrated with a touch screen system (not specifically shown). The controller 202 may interface with the touch screen system by way of touch screen interface 224. Thus, using the touch screen system and the touch screen interface 224, the controller 202 may receive information from the user, such as by way of keyboard implemented using the display device 220. In other cases, the mobile device 200 may implement a physical keyboard in addition to, or in place of, the touch screen system and touch screen interface 224.

Finally, the example mobile device 200 comprises a battery 226. The battery 226 provides power to all of the noted internal components, but the electrical connections to the battery 226 are not shown so as not to unduly complicate the drawing. The battery 226 may take any suitable form, such as a lithium-ion battery, but any currently available or after-developed battery technology may be used. Thus, the mobile device 200 may be any currently available mobile device (e.g., APPLE® brand iPhones available from Apple, Inc., or ANDROID® brand devices available from Google, Inc.) or any after-developed hand-held computing device or mobile device. The discussion now turns to a software environment in which the example embodiments are operated, and it will be understood the various pieces of the software that make up the software environment may be executed by the controller 202, and in specific examples stored on the memory 206 and executed by the processor 204.

Figure 3:
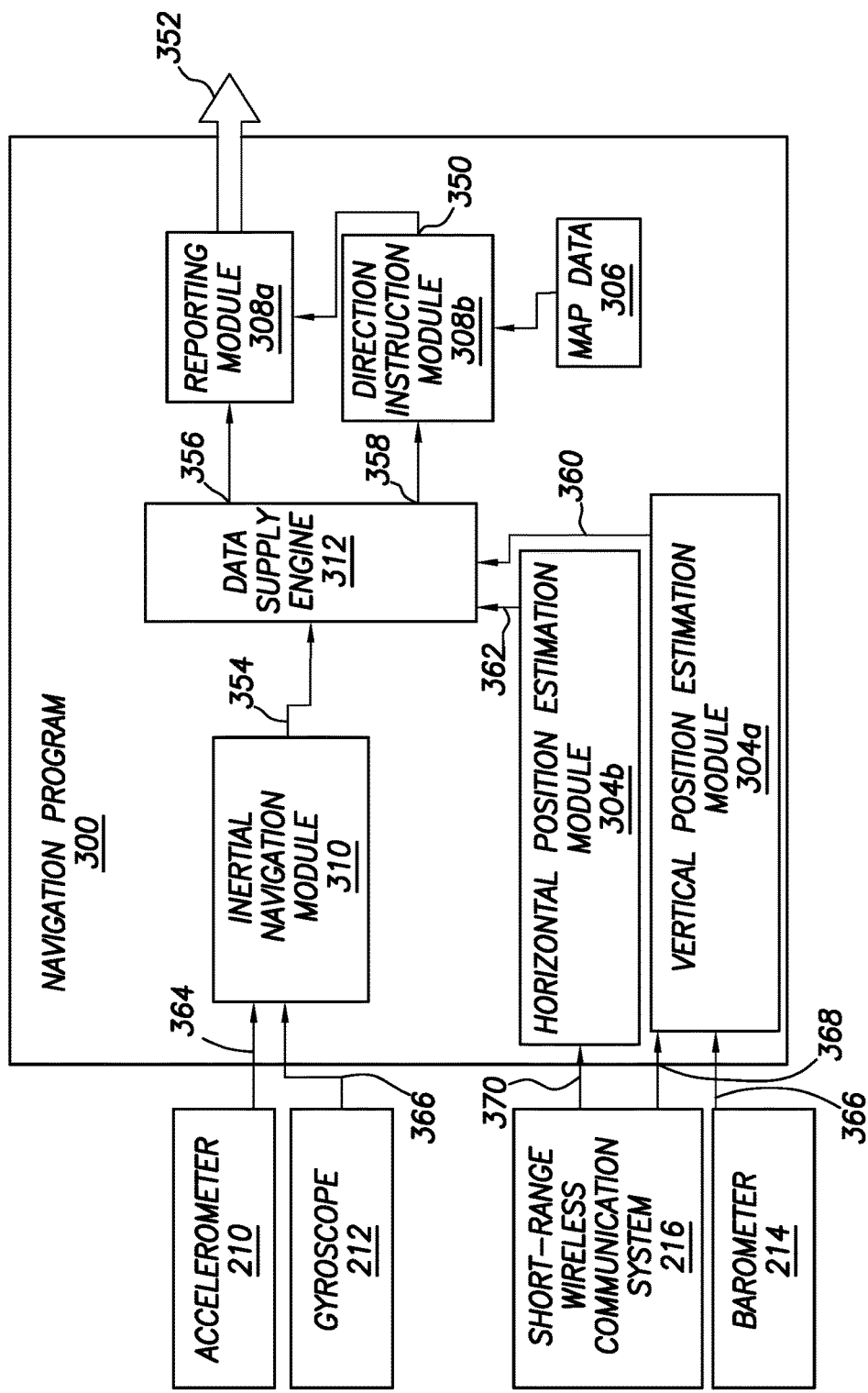
FIG. 3 shows a block diagram of a navigation program in accordance with at least some embodiments.

FIG. 3 shows a block diagram of a navigation program in accordance with at least some embodiments. In particular, FIG. 3 shows that navigation program 300 interfaces with various devices of the mobile device 200 (FIG. 2), such as the accelerometer 210, gyroscope 212, barometer 214, and short-range wireless communication system 216. The navigation program 300 may provide to the user navigation information, such as by placing that navigation information in display device 220 of FIG. 2. The example navigation program 300 is conceptually, though not necessarily physically, divided into a plurality of modules and data engines. In particular, the example navigation program 300 comprises a vertical position estimation module 304a, which, as the name implies, is designed and programmed to determine or estimate the vertical position, elevation, or level within a building, as described herein. The vertical position estimation module 304a reads or takes input in the form of beacon data 368 from the short-range wireless communication system 216 and barometric pressure data 366 from the barometer 214. A horizontal position estimation module 304b also receives beacon data 370 from the short-range wireless communication system 216. An inertial navigation module 310 provides movement data 354 to a data supply engine 312 based on accelerometer data 364 and gyroscope data 372. In the example environment of FIG. 3, horizontal position data 362 is provided from horizontal position estimation module 304b to data supply engine 312. In the example environment of FIG. 3, vertical position data 360 is provided from vertical position estimation module 304a to data supply engine 312, and in particular the vertical position estimation module 304a periodically (e.g., once every second) provides position data (e.g., a level within a building) such that three-dimensional location data 356 can be provided to a reporting module 308a. Further, three-dimensional location data 358 can be provided to a direction instruction module 308b and navigation instructions 350 can be provided to other processes through the location reporting module 308a as a part of location and direction instruction reports 352 that can be provided to other processes through the location reporting module 308a. The direction instruction module 308b further receives map data 306 from the navigation program 300, such as map data downloaded through the cellular communication system 218 (FIG. 2) or read through the short-range wireless communication system 216.

In example embodiments, vertical position estimation module 304a is conceptually, though not necessarily physically, divided into a plurality of underlying modules and engines.

Vertical position estimation module 304a receives as input barometric pressure data 366 from the barometer 214, as well as location information through the short-range wireless communication system 216, such as location information such as beacon data 370 from beacon devices 112 (FIG. 1A). The position vertical position estimation module 304a is shown separate from the horizontal position estimation module 304b to signify that any currently available or after-developed position estimation methodology may be used. In many cases the horizontal position estimation module 304b uses a triangulation method and/or a RSSI method to determine horizontal location.

Figure 4:
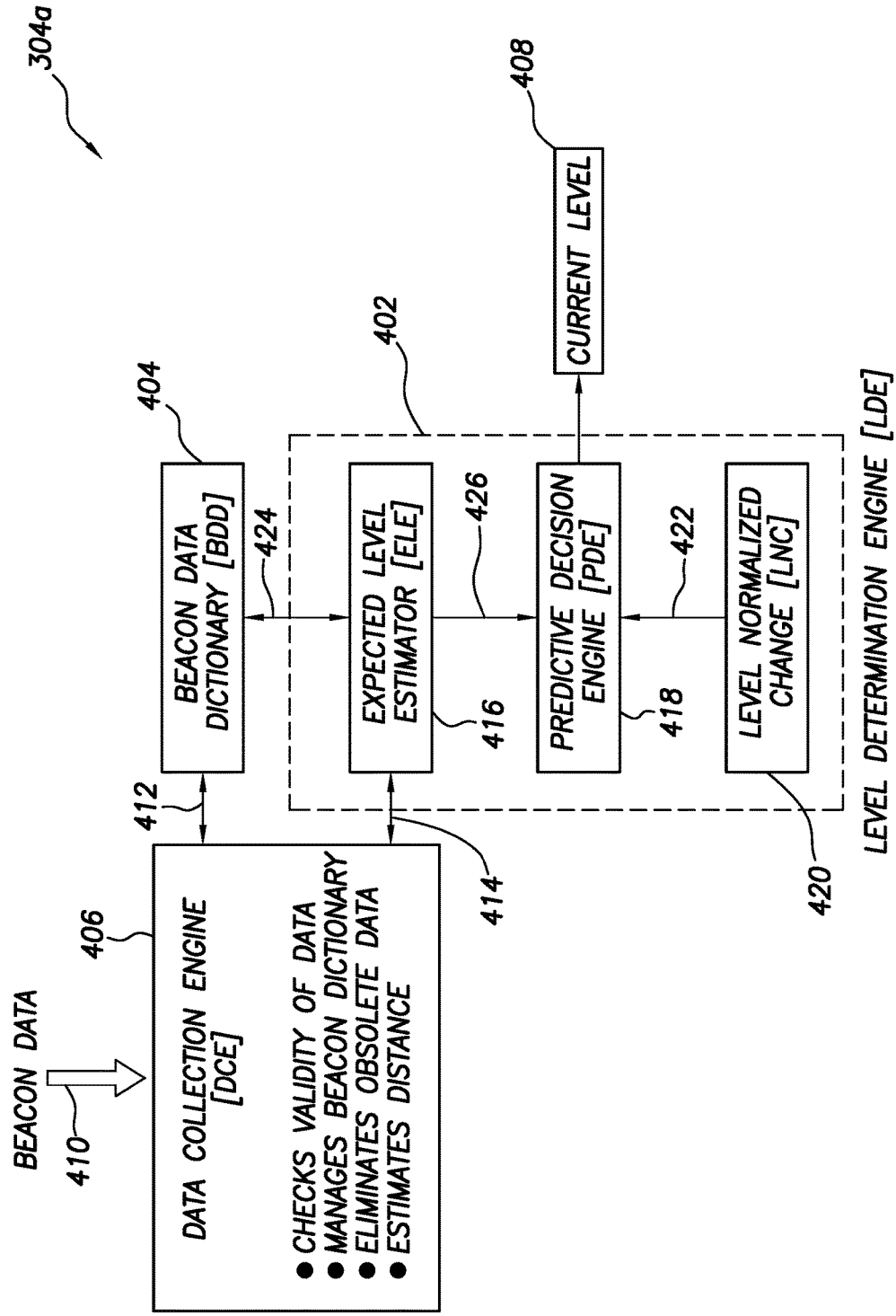
FIG. 4 shows a block diagram of the internal components of the vertical position estimation module in accordance with at least some embodiments.

FIG. 4 shows a block diagram of the internal components of the vertical position estimation module in accordance with at least some embodiments. Vertical position estimation module receives beacon data 410 at a data collection engine 406 (DCE), which checks validity of the data, manages a beacon data dictionary 404 (BDD), eliminates obsolete data, and estimates beacon distances. Beacon data dictionary 404 is a data structure containing information reported on local beacons. Data collection engine 406 provides data 412 to beacon data dictionary 404 and provides data 414 to expected level estimator 416 (ELE). Expected level estimator 416 estimates a current level based on data in BDD 404 and updates the expected level, if necessary. A level determination engine 402 includes expected level estimator 416, a predictive decision engine 418 (PDE), and a level normalized change module 420 (LNC). Expected level estimator shares data 414 bi-directionally with data collection engine 406 and shares data 424 bi-directionally with beacon data dictionary 404. Predictive decision engine 418 provides a current level 408 based upon expected level data 426 received from expected level estimator 416 and level normalized change data 422 received from level normalized change module 420. Level normalized change data 422 is a normalized value representing a pedestrian's level change. Level normalized change data 422 and expected level data 426 are inputs to Predictive decision engine 418 that determines the current level 408 of the pedestrian. As shown in FIG. 4, level determination engine 402 includes of three illustrated modules: expected level estimator 416 (ELE), level normalized change module 420 (LNC) and predictive decision engine 418 (PDE). Expected level estimator 416 (ELE) estimates a level based on beacon data. Level normalized change module 420 (LNC) estimates normalized change in level using sensor data.

Predictive decision engine 418 (PDE) takes inputs from level normalized change module 420 (LNC) and expected level estimator 416 (ELE) and their respective error covariances to predict current floor level.

Figure 5:
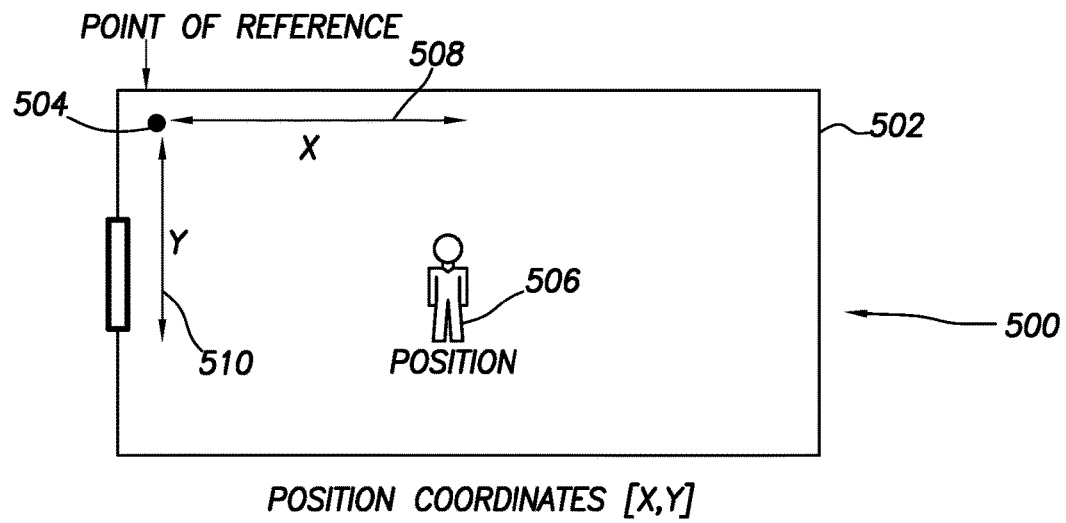
FIG. 5 shows an overhead conceptual view of a process of location determination accordance with at least some embodiments.

FIG. 5 shows an overhead conceptual view of a process of location determination accordance with at least some embodiments. As shown in diagram 500, position 506 of a user with regard to a point of reference 504, such as a beacon 112 of FIG. 1A in an enclosed space 502, is determined with regard to coordinates along an x-axis 508 and a y-axis 510.

Figure 6:
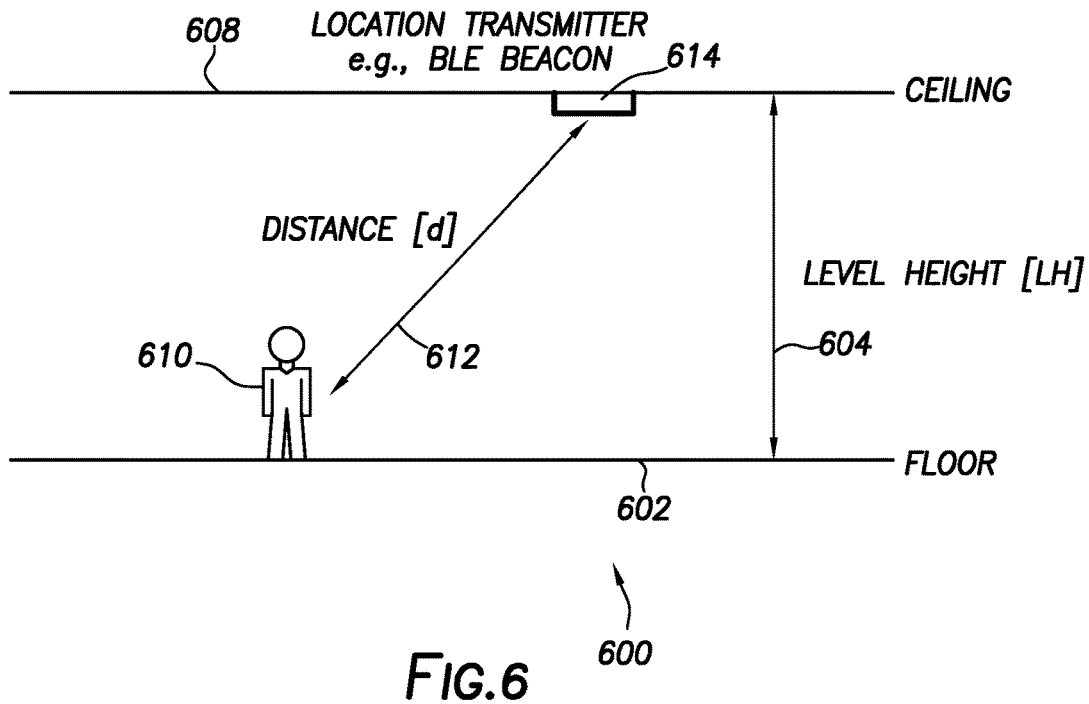
FIG. 6 shows a side conceptual view of a process of location determination in accordance with at least some embodiments.

FIG. 6 shows a side conceptual view of a process of location determination in accordance with at least some embodiments. As shown in diagram 600, a beacon 614 is shown as mounted on a ceiling 608 that is suspended at a known level height 604 (LH) from a floor 602. Distance 612 (d) from beacon 614 is the distance between the beacon 614 and the pedestrian 610 without consideration of any angle.

Distance (d) 612 is estimated using signal strength represented by rssi and two constants, a and n. Constants (a, n) are determined by the type of radio transmitter and its power level. In some cases those constants are empirically determined, in some cases they are dependent on components used.

$$d = 10^{\frac{-rssi-a}{n}} \quad (1)$$

Because the formula above becomes less and less accurate as the pedestrian moves away from the transmitter, estimation of expected accuracy is therefore a part of distance estimation in some embodiments. In recognition of the impact of distance Accuracy [dA] on overall accuracy for floor level estimation, some embodiments calculate distance accuracy using a formula as shown below:

$$dA = e^{-hd} \quad (2)$$

As used herein, h is a constant and d is the estimated distance. Constant [h] is venue dependent as structures and obstacles change from venue to venue. Using an initial value (in some embodiments, h=0.05) and embodiments improve this initial value when used in a particular venue using distance values with higher certainty. Therefore, venue dependent constant [h] is improved when a pedestrian is in a venue, increasing significantly the overall accuracy of level determination.

Level Height 604 (LH) is the distance from ceiling to floor for a particular floor level. It will be appreciated that some buildings will have a number of different LH values on a single floor, as some areas of the same floor may have a higher ceiling or a lower floor. In some embodiments, LH is a map-encoded parameter. When required, LH is taken directly from the map.

A time stamp is used to stamp the data collected with time. A time stamp can then be used to indicate how old the data is. Within the context of some embodiments, a time stamp is accurate down to milliseconds. A typical time stamp for some embodiments is of the following form, where the last four digits indicate milliseconds.

$$hh.mm.ss.xxxx—07.03.20.874 \quad (3)$$

Figures 7A, 7B:
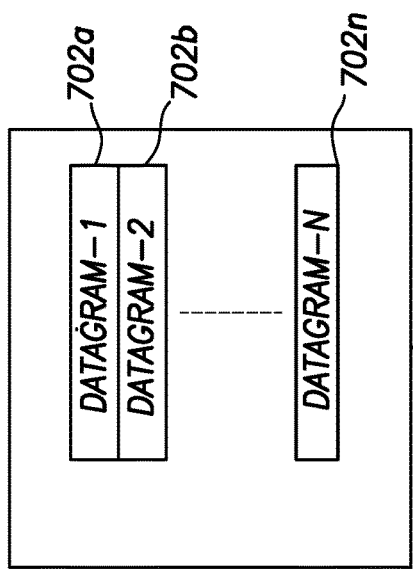
FIG. 7A shows a schematic of a beacon data dictionary for use in location determination in accordance with at least some embodiments.
FIG. 7B shows a schematic of a beacon data dictionary for use in location determination in accordance with at least some embodiments.

FIG. 7A shows a schematic of a beacon data dictionary for use in location determination in accordance with at least some embodiments. A beacon data dictionary 700 is a data structure including a series of datagrams 702a-n. Beacon data dictionary 700 is a repository for collected data, in some embodiments understood as a hash table. In some embodiments, there is no constraint placed on the size of beacon data dictionary 700, as it is size-limited by an area that a pedestrian can cover within a certain time. However, if required, a size of BDD 700 may be limited for a given embodiment. Each entry into BDD 700 is called a datagram 702a-n.

FIG. 7B shows a schematic of a beacon data dictionary for use in location determination in accordance with at least some embodiments. A datagram 722 includes a representation of beacon data including x location 710, y location 712, level 714, time stamp 716, distance accuracy 718, and distance 720. A datagram key is composed of x location 710, y location 712, and level 714. A datagram key is used in some embodiments to increase data access power efficiency and speed, so as to decrease handheld computing device energy consumption in data location. Some parameters are in the datagram are calculated. Some parameters of datagram are captured from nearby beacon advertisements.

In some embodiments, program code running on mobile device is configured to work with a few advertising signals per second, which reduces energy requirements of the handheld computing device and it allow beacons to last longer. For example, beacons advertising 50 times per second will typically run out of battery power in 3 months, whereas, if advertisement signals were sent 3 times per second, the battery may last for a year.

Figure 8:
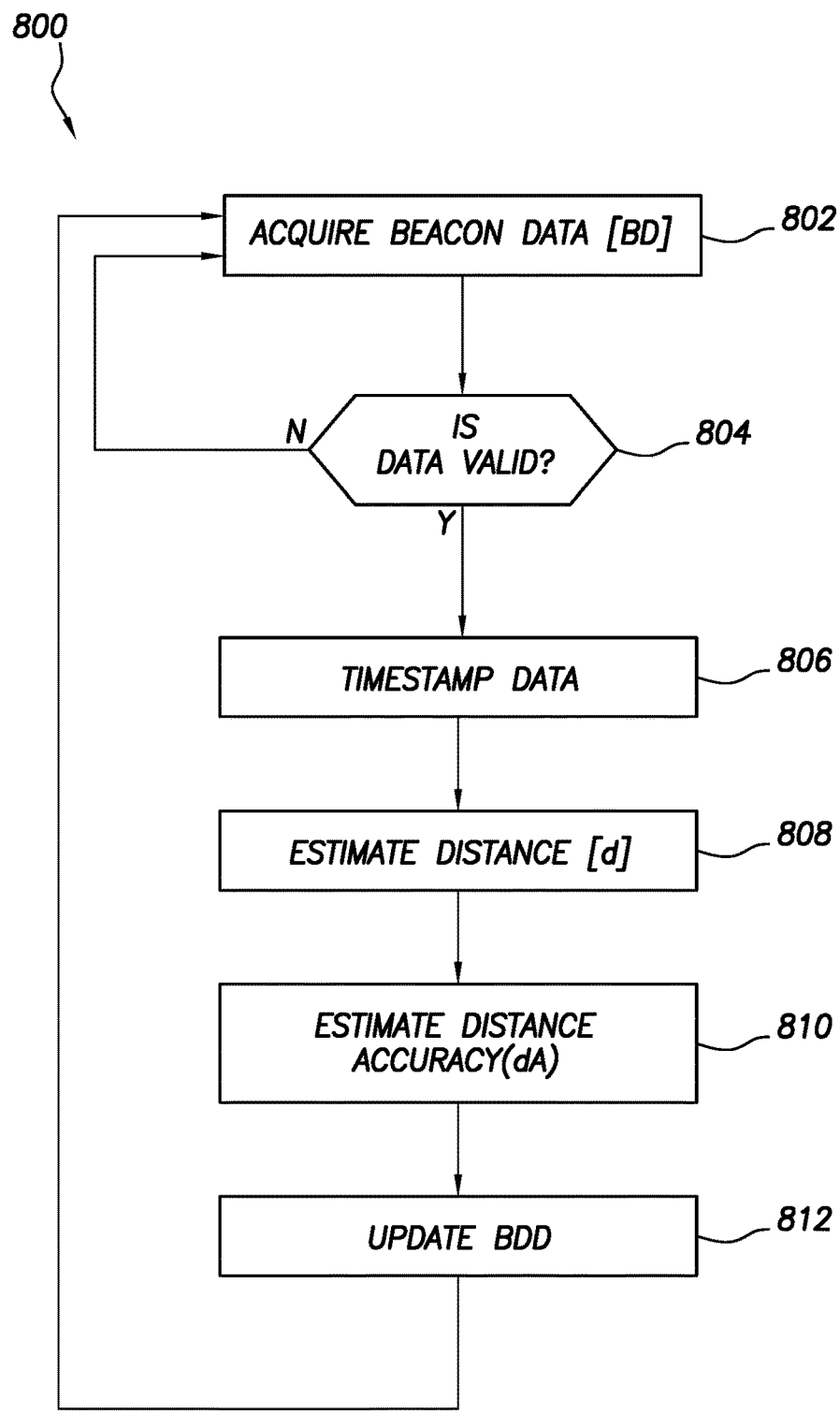
FIG. 8 shows a flowchart of a method for maintaining a beacon data dictionary, in accordance with at least some embodiments.

FIG. 8 shows a flowchart of a method for maintaining a beacon data dictionary, in accordance with at least some embodiments. In some embodiments, data collection engine 406 of FIG. 4 executes process 800 as shown. In some embodiments, a primary task of data collection engine 406 of FIG. 4 is to listen to beacon advertisements and to collect, maintain data and update beacon data dictionary 404 of FIG. 4. Data collection engine 406 of FIG. 4 executes process 800 periodically, capturing and validating data in preparation for other operations.

Beacon data is acquired (block 802). A determination is made as to whether the data is valid (block 804). Validity of data is checked by ensuring that captured data is coming from beacons within the building and it is within limits. For example, a beacon reporting itself as being on level 6 in a 3-story building could be rejected on the assumption that it is not possible to have floor level 6 in a 3-story building. If the data is not valid, the process returns to block 802 for acquisition of additional beacon data. If the data is valid, a time stamp is generated (block 806). Having ensured that data is valid, data time stamped, creating a reference point for its age. Distance is estimated (block 808). In estimating distance, level height (LH) is extracted from map data and checked to confirm that it is within correct limits. Distance accuracy is estimated (block 810). Data collection engine 406 estimates distance Accuracy (dA) and improves the value of (h) using an internal machine learning engine. The beacon data dictionary 404 of FIG. 4 is updated with a newly-created valid datagram (block 812). The process then returns to block 802 for acquisition of additional beacon data. In some embodiments, data collection engine 406 of FIG. 4 does not delete data from beacon data dictionary 404 of FIG. 4, allowing deletions to be handled by another module.

Figure 9:
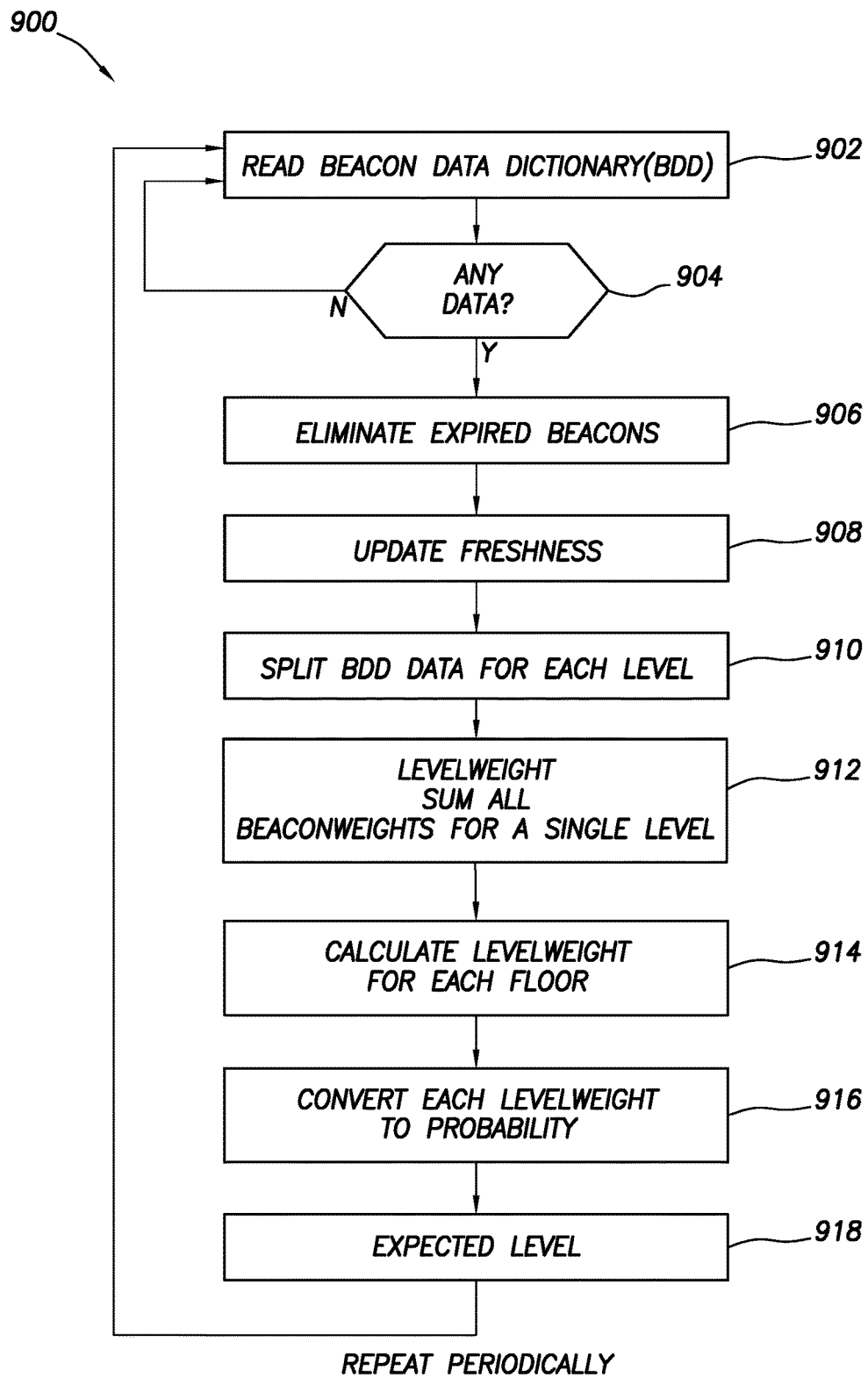
FIG. 9 shows a flowchart of a method for estimating an expected level, in accordance with at least some embodiments.

FIG. 9 shows a flowchart of a method for estimating an expected level, in accordance with at least some embodiments. In some embodiments process 900 executes on expected level estimator 416 of FIG. 4, and, using data collected from beacons, expected level estimator 416 (ELE) generates an estimate of expected floor level along with its error covariance. The beacon data dictionary 404 of Figure is read (block 902). A determination is made as to whether data is present (block 904). If no data is present, the process returns to block 902. If data is present, expired beacons are eliminated (block 906). Once data is acquired from beacon data dictionary 404, expired beacon data is eliminated by deletion. In some embodiments, expiry duration is a constant time span and is decided upon by considering the trade-off. The longer the expiry duration, the better the estimation becomes as there are more beacon data to use in floor level estimate. However, longer expiry duration reduces system responsiveness, as it needs to wait for more data to be collected. In some embodiments, expected level estimator 416 starts off with an average expiry duration constant and adjusts duration over a period of time for a particular venue.

Freshness is updated (block 908). The following formula is used for freshness calculation.

$$\text{freshness} = \max\left(0, 1 - \frac{timenow - timestamp}{expiryduration}\right) \quad (4)$$

Data from beacon data dictionary 404 for each level is split (block 910). Beacon data is grouped for each level. For example, floor level 1 may have data from three beacons and floor level 2 may have data only from one beacon.

Beacon weights for each level are calculated (block 912). For each beacon, beaconweight is calculated using the following formula.

$$\text{beaconweight} = (freshness * dA)/d \quad (5)$$

In the formula above, dA is distance accuracy and d is the distance of pedestrian from beacon.

Level weight is calculated for each floor (block 914). To calculate weight for a floor, all beaconweights for a particular floor is summed. The mathematical expression is $$\text{levelweight}(l) = \Sigma_n \text{ beaconweight}(n) \quad (6)$$

In the formula above, n is the number of beacons for a single level. Levelweight(l) is calculated for each floor level. To express the above mathematics in words: beaconweight(n) for each beacon is a bigger floating number if beacon data is fresher and its accuracy is higher. Levelweight(l) becomes a bigger floating point number with higher value beaconweights for a single floor.

Level weight is converted to probability (block 916). Levelweights are converted into probability using the sum of all levelweights.

An expected level is calculated (block 918). Expected level uses summed level probabilities to estimate an expected level using the formula below.

$$E(L) = \Sigma_{l \in L} \, l Pr(L=l) \quad (7)$$

In the formula above E(L) is expected level, and L is the set of possible levels in the venue, fetched from the map data. This is represented by: $z_t = [b_t]$, where $b_t$ is the expected beacon level at time t.

Error covariance for E(L) is $R_t = [\sigma_t^{b^2}]$. $R_t$ is a floating point number that indicates reliability of beacon data. In some embodiments, venues are assigned an average $R_t$ at initialization. In time this value is improved by a machine learning engine in cloud as venue is used and more data is obtained over time.

The process returns to block 902 for periodic repetition.

Figure 10:
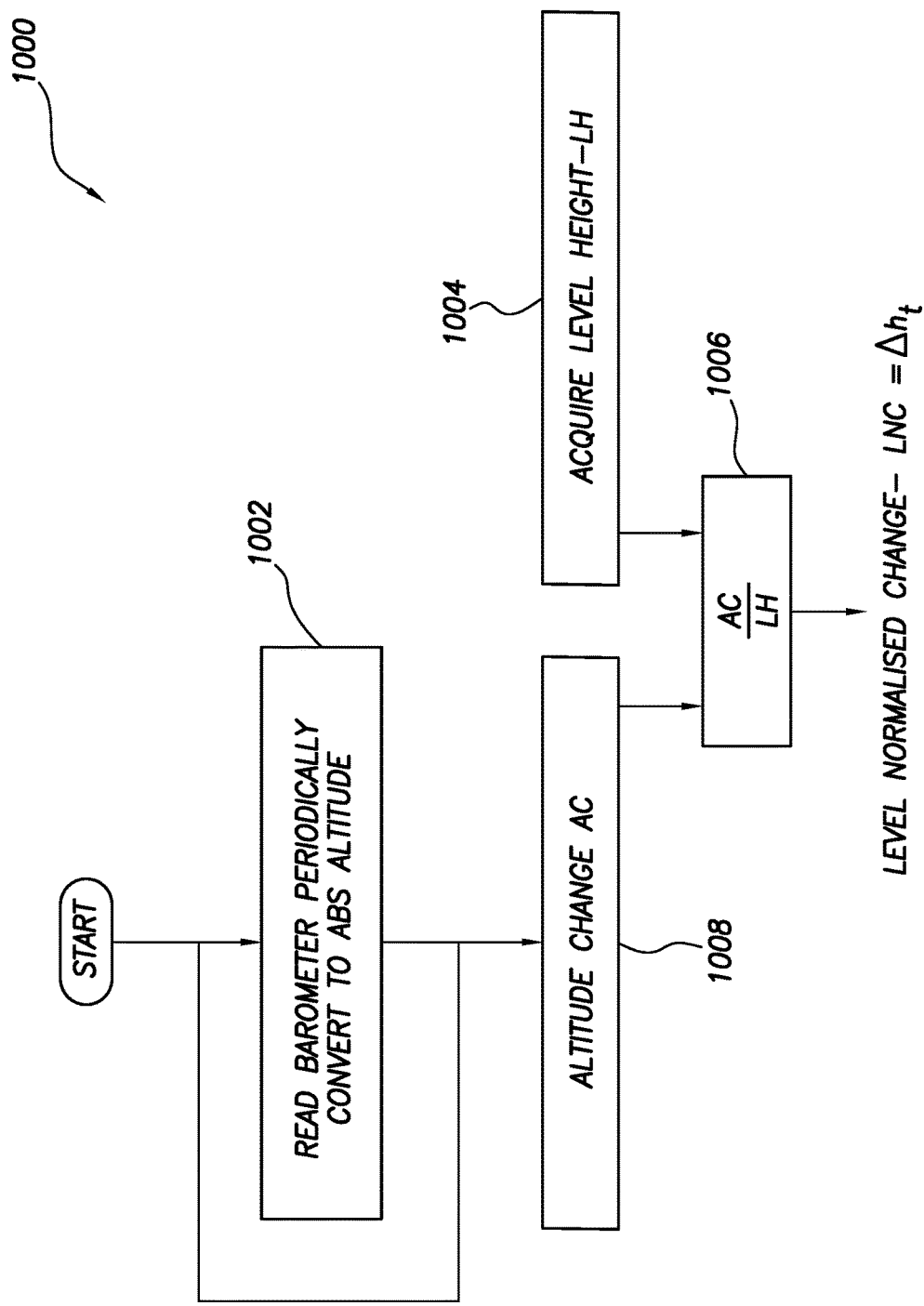
FIG. 10 shows a flowchart of a method for estimating a level normalized change, in accordance with at least some embodiments.

FIG. 10 shows a flowchart of a method for estimating a level normalized change, in accordance with at least some embodiments. Level normalized change module 420 executes process 1000. Level normalized change (LNC) is a value that indicates a pedestrian's level change as a floating point number and not as an integer. This floating point number is then used in predicting pedestrian level. Floating point arithmetic allows for more accurate level predictions.

A barometer reading is periodically taken and converted to absolute altitude (block 1002). Barometers measure air pressure and are used for indicating weather conditions, and air pressure can also easily be converted into altitude. Weather changes take place rather slower than a pedestrian walking in a building. Altitude estimated in such a short space of time reflects almost no influence from changing whether conditions. As a pedestrian walks in a building, it is therefore possible to measure relative altitude changes using a barometer.

An altitude change is calculated (block 1008). In some embodiments, estimation techniques use floating point numbers to increase accuracy. Use of loating point numbers in most calculations increases final level estimation accuracy. Relative altitude (Altitude Change) as pedestrian walks reduces inaccuracies due to floor changes.

A level height is acquired (block 1004). Level Height (LH) is a map parameter and is extracted using pedestrian's current position.

A level normalized change is calculated (block 1006). Level Normalized Change (LNC) is then estimated by a division operation.

Consider an example: Note that resultant LNC is a floating point number.

Altitude-Reading-1–Altitude Reading-2=Altitude Change [AC]=2.2–1.0=1.2
AC=1.2
LH=2.5
LNC=1.2/2.5=0.48

LNC is expressed as a matrix as $$u_t = [\Delta h_t] \quad (8)$$

In the above expression, $h_t$ is the relative change in altitude at a time t. Note that all barometers have some error associated with their readings. Accuracy is a manufacturer specified constant. Sensor type and manufacturer are detected by embodiments and an applicable accuracy constant is selected to be used on a particular hardware platform. Accuracy is also relative altitude dependent. It is squared to convert it into variance. Accuracy covariance is then expressed as follows.

$$Q_t = [\sigma_t^{h^2}], \quad (9)$$

where $\sigma_t^h$ is the accuracy and $\sigma_t^{h^2}$ is covariance and $Q_t$ is matrix representation. LNC ($u_t = [\Delta h_t]$) and $Q_t$ are used by Predictive Decision Engine.

Figure 11:
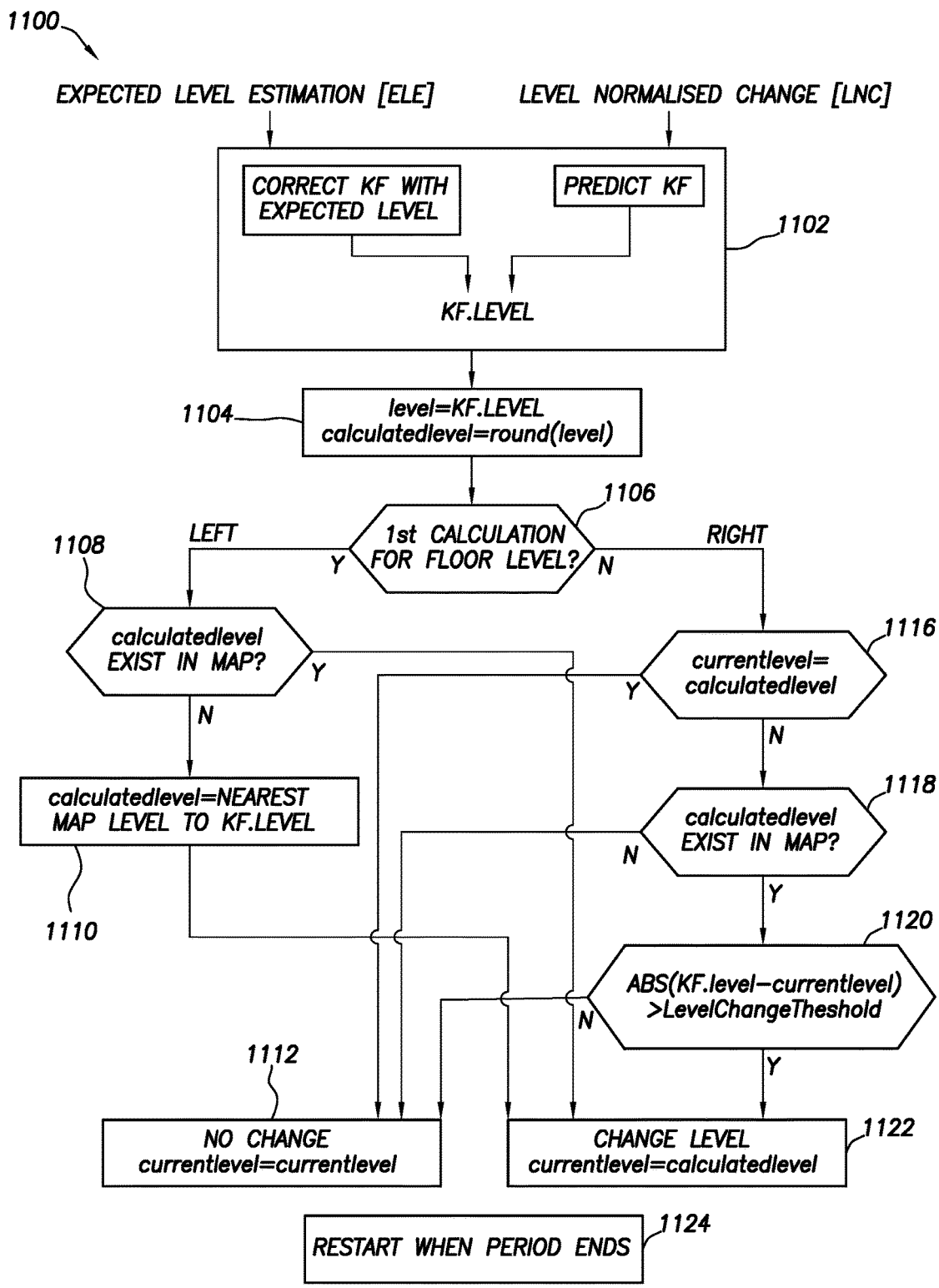
FIG. 11 shows a flowchart of a method for iteratively predicting and revising a vertical location, in accordance with at least some embodiments.

FIG. 11 shows a flowchart of a method for iteratively predicting and revising a vertical location, in accordance with at least some embodiments. Process 1100 executes in predictive decision engine 418. At block 1102, expected level estimation ELE and level normalized change (LNC) with their respective error covariances are inputs to a Kalman filter, which continuously predicts and corrects its predictions using expected level estimates. The Kalman filter (KF) then generates a floating point number, KF.level. Use of the Kalman filter, in some embodiments, presents significant error resiliency in floor level determination.

At block 1104, a rounded value of KF.level is calculated as the variable calculatedlevel.

At block 1106, a determination is made as to whether the current calculation is the first calculation for a floor level. If the current calculation is the first calculation for a floor level the process moves to block 1108.

At block 1108, a determination is made as to whether the value of calculatedlevel exists in map data. If the value of calculatedlevel exists in the map data, then the process proceeds to block 1122, which is described below.

Returning to block 1108, if the value of calculatedlevel does not exist in the map data, then the process proceeds to block 1110. Calculatedlevel is reset to the nearest map level to the value of KF.level. The process proceeds to block 1122, at which the variable currentlevel is reset to the value of calculatedlevel.

Returning to block 1106, if the current calculation is not the first calculation for a floor level the process moves to block 1116. At block 1116, a determination is made as to whether the value of the variable currentlevel is equal to the value of the variable calculated level. If the value of the variable currentlevel is equal to the value of the variable calculated level, then the process proceeds to block 1112, at which no change to the value of currentlevel is made. The process then repeats periodically.

Returning to block 1116, if the value of the variable currentlevel is not equal to the value of the variable calculated level, then the process proceeds to block 1118, at which a determination is made as to whether the value of calculatedlevel exists in the map data. If the value of calculatedlevel does not exist in the map data, then the process moves to block 1112, which is described above.

Returning to block 1118, if the value of calculatedlevel exists in the map data, then the process moves to block 1120, at which a determination is made as to whether the absolute value of a difference between the value of KF.level-currentlevel exceeds a threshold. If the value of KF.level-calculatedlevel does not does not exceed the threshold, then the process moves to block 1112, which is described above.

Returning to block 1120, if the absolute value of a difference between the value of KF.level-currentlevel exceeds the threshold, then the process moves to block 1122, at which a level change is made and currentlevel is set to calculatedlevel. The process then repeats periodically.

To further appreciate the mechanism described above, consider two examples.

A first example follows the right branch of the flowchart through blocks 1116-1118.
currentlevel=2
At block 1102, KF.level=2.85.
At block 1104, calculatedlevel=round(level)=3.
Assuming at block 1106 that this example is not the first calculation for this floor level, at block 1116, "currentlevel≠calculatedlevel." Therefore, the process next moves to block 1118, at which a determination is made as to whether the value of calculatedlevel exists in the map data. Assume that the answer is "Y". Assume that level change threshold is 0.8. Then next calculation is ABS(2.85−2)>0.8->0.85>0.8->"Y" at block 1120.

Therefore current level changes from 2 to 3 at block 1122.

A second example follows the left branch of the flowchart through steps 1108-1112.
currentlevel=undefined, as this is the first calculation.
KF.level=2.2
calculatedlevel=round(level)=2
Let us also assume that Map data does not include a floor level 2.

A block 1108, a determination is made as to whether the value of calculatedlevel exists in the map data. The answer is "N". At block 1110, the nearest map level to KF.level is chosen. KF.level "2.2" is closer to "3" than to "1". Therefore, floor level 3 is chosen.

To explain KF calculations mathematically, the state of the Kalman Filter at time t is represented by: $\hat{x}_{t|t} = [\hat{\lambda}_{t|t}]$, where $\hat{\lambda}_{t|t}$ is the Kalman Filter's floating point level estimate at time t. The level normalized change (LNC) computed from the barometer data is represented by, $u_t = [\Delta h_t]$, where $\Delta h_t$ corresponds to LNC at time t. The expected level computed from the beacon data is represented by, $z_t = [b_t]$, where $b_t$ is the expected beacon level at time t, i.e. the expected level computed from the beacon data currently in BDD. The state is updated with the LNC data at time t ($u_t$) using the prediction procedure of the Kalman Filter:

$$\hat{x}_{t|t-1} = F_t \hat{x}_{t-1|t-1} + B_t u_t, \text{ and} \quad (10)$$

$$P_{t|t-1} = F_t P_{t-1|t-1} F_t^T + Q_t, \quad (11)$$

where $F_t$ is the state transition model, and $B_t$ is the control-input model, which are identity matrices of size 1×1. $P_{t|t-1}$ is the predicted covariance estimate, and $Q_t$ is the process noise covariance matrix, i.e., the error covariance of LNC ($\Delta h_t$).

The state is updated with the expected beacon level at time t ($z_t$) by the correction procedure of the Kalman Filter $$\tilde{y}_t = z_t - H_t \hat{x}_{t|t-1}, \quad (12)$$

$$S_t = H_t P_{t|t-1} H_t^T + R_t, \quad (13)$$

$$K_t = P_{t|t-1} H_t^T S_t^{-1}, \quad (14)$$

$$\hat{x}_{t|t} = \hat{x}_{t|t-1} + K_t \tilde{y}_t, \quad (15)$$

$$P_{t|t} = (I - K_t H_t) P_{t|t-1}, \quad (16)$$

where $\tilde{y}_t$ is the measurement residual. $S_t$ is the residual covariance, $K_t$ is the optimal Kalman gain, $\hat{x}_{t|t}$ is the corrected state estimate. $P_{t|t}$ is the corrected covariance estimate. $R_t$ is the measurement noise covariance matrix, i.e., the error covariance of the expected beacon level ($b_t$), and $H_t$ is the observation model which is an identity matrix of size 1×1.

Figure 12:
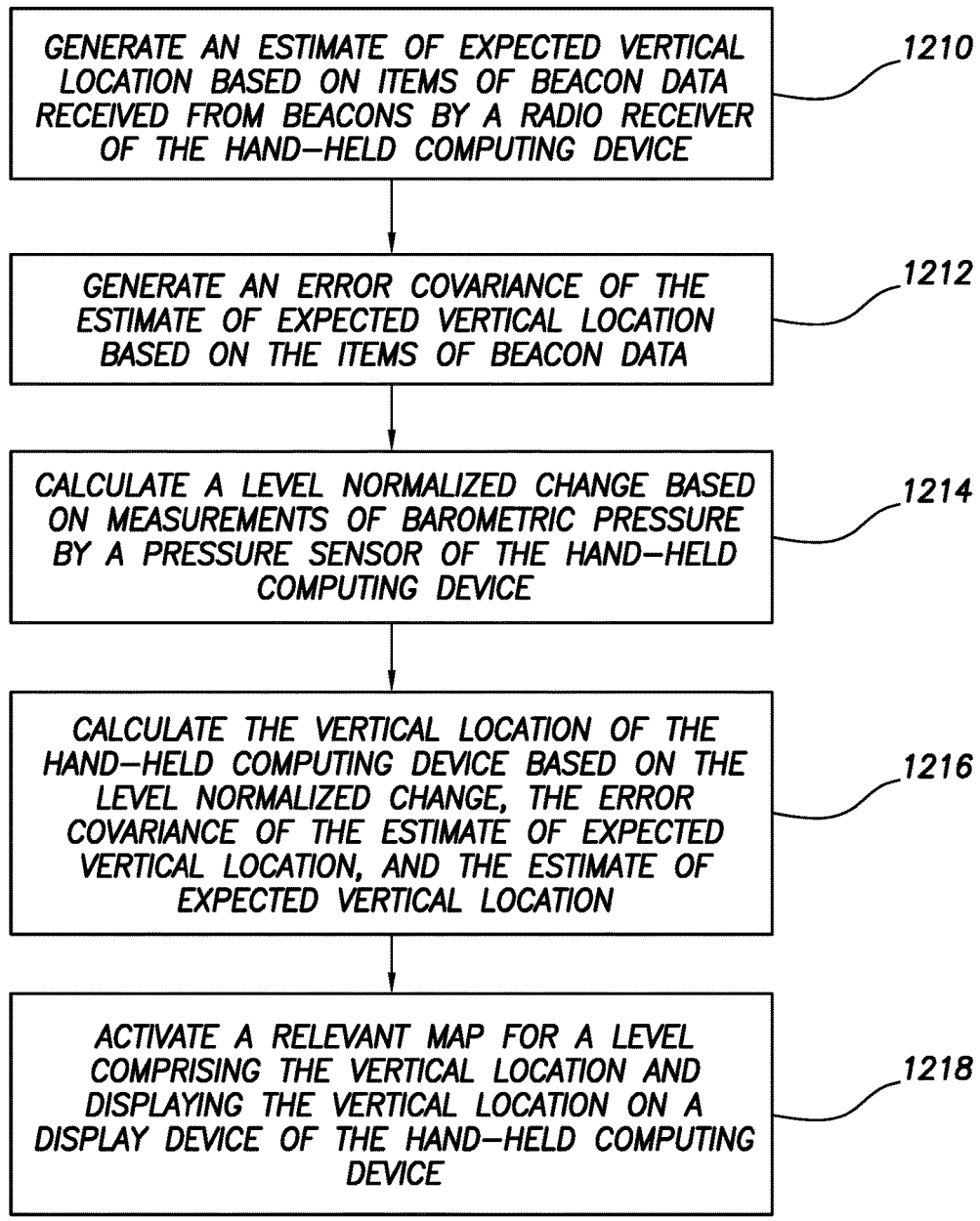
FIG. 12 shows a method in accordance with at least some embodiments.

FIG. 12 shows a method in accordance with at least some embodiments. An estimate of expected vertical location is generated, based on items of beacon data received from beacons by a radio receiver of the hand-held computing device (block 1210). In one example embodiment, an estimate of expected vertical location includes vertical position data 360 of FIG. 3, such as a level within a building, which is generated by an expected level estimator 416 of FIG. 4, based on items of beacon data 350 of FIG. 3 received from beacons 112a-f of FIG. 1B by a radio receiver, such as short range wireless communication system 216 of FIG. 2, of the hand-held computing device (e.g., mobile device 200 of FIG. 2). In some embodiments, the beacon data is read from a beacon data dictionary. In some embodiments, the generating the integer value representing an estimate of the expected level inside the structure based on a set of respective probabilities further includes generating respective level weights sums from probabilities for beacons on each of a set of levels from which the items of beacon data been received.

An error covariance of the estimate of expected vertical location based on the items of beacon data is generated (block 1212). In one example embodiment, expected level estimator 416 of FIG. 4 generates an error covariance of the estimate of expected vertical location based on the items of beacon data 350 of FIG. 3 received from beacons 112a-f of FIG. 1B. In some embodiments, generating the estimate of expected vertical location further includes generating an integer value representing an estimate of an expected level inside a structure based on a set of respective probabilities calculated at least in part from beacon data comprising beacon distances, beacon distance accuracies, and items of beacon data time information, wherein the beacon distance accuracies are calculated using respective venue-dependent accuracy constants.

A level normalized change is calculated based on measurements of barometric pressure made by a pressure sensor of the hand-held computing device (block 1214). In one example embodiment, a level normalized change is calculated by level normalized change module 420 of FIG. 4 based on measurements of barometric pressure, such as barometric pressure data 366 of FIG. 3 made by a barometer 214 of FIG. 2, which is one example of a pressure sensor, of the hand-held computing device (e.g., mobile device 200 of FIG. 2).

The vertical location of the hand-held computing device is calculated based on the level normalized change, the error covariance of the estimate of expected vertical location, and the estimate of expected vertical location (block 1216). In one example embodiment, the vertical location of the hand-held computing device is calculated based on the level normalized change, the error covariance of the estimate of expected vertical location, and the estimate of expected vertical location by predictive decision engine 418 of FIG. 4. In some embodiments, the calculating the vertical location of the hand-held computing device further includes generating an integer value representing a level inside a structure based on a Kalman filter having inputs comprising the level normalized change, the error covariance of the estimate of expected vertical location, and the estimate of expected vertical location. In some embodiments, the inputs further include an error covariance of the level normalized change and the method further includes refining the error covariances using respective items of measured data. In some embodiments, the inputs further include an error covariance of the estimate of expected vertical location representing reliability of the items of beacon data.

A relevant map for a level comprising the vertical location is activated, and the vertical location is displayed on a display device of the hand-held computing device (block 1218). In one example embodiment, a relevant map from map data 306 of FIG. 3 for a level comprising the vertical location is activated, and the vertical location is displayed on a display device 222 of FIG. 2 of the hand-held computing device (e.g., mobile device 200 of FIG. 2).

In some embodiments, the process repeats steps 1210-1218, iteratively calculating expected vertical location from beacon data and level normalized change estimated from barometric pressure and respective error covariances.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method for determining a vertical location of a hand-held computing device, the method comprising:
   generating an estimate of expected vertical location based on items of beacon data received from beacons by a radio receiver of the hand-held computing device;
   generating an error covariance of the estimate of expected vertical location based on the items of beacon data;
   calculating a level normalized change based on measurements of barometric pressure by a pressure sensor of the hand-held computing device;
   calculating the vertical location of the hand-held computing device by generating an integer value representing a level inside a structure based on a Kalman filter having inputs comprising the level normalized change, the error covariance of the estimate of expected vertical location, and the estimate of expected vertical location; and
   activating a relevant map for a level comprising the vertical location and displaying the vertical location on a display device of the hand-held computing device.

2. The computer-implemented method of claim 1, wherein the inputs further comprise an error covariance of the level normalized change and the method further comprises refining the error covariances using items of measured data.

3. The computer-implemented method of claim 1, further comprising iteratively calculating expected vertical location from beacon data and level normalized change estimated from barometric pressure and error covariances.

4. The computer-implemented method of claim 1, wherein the inputs further comprise an error covariance of the estimate of expected vertical location representing reliability of the items of beacon data.

5. The computer-implemented method of claim 1, wherein the method further comprises:
   assigning time information to items of beacon data;
   estimating beacon distances for the items of the beacon data; and
   estimating beacon distance accuracies for the items of beacon data.

6. The computer-implemented method of claim 5, wherein the method further comprises:
   receiving the items of beacon data at the radio receiver of the hand-held computing device;
   determining validities of the items of beacon data; and
   storing the beacon distances, beacon distance accuracies, and items of beacon data time information in a beacon data dictionary.

7. The computer-implemented method of claim 6, wherein the beacon data dictionary comprises a table of datagrams having index keys based on a horizontal beacon location and a beacon level.

8. A computer-implemented method for determining a vertical location of a hand-held computing device, the method comprising:
  generating an estimate of expected vertical location by generating an integer value representing an estimate of an expected level inside a structure based on a set of probabilities calculated at least in part from beacon data comprising beacon distances, beacon distance accuracies, and items of beacon data time information, wherein the beacon distance accuracies are calculated using venue-dependent accuracy constants;
  generating an error covariance of the estimate of expected vertical location based on the items of beacon data;
  calculating a level normalized change based on measurements of barometric pressure by a pressure sensor of the hand-held computing device;
  calculating the vertical location of the hand-held computing device based on the level normalized change, the error covariance of the estimate of expected vertical location, and the estimate of expected vertical location; and
  activating a relevant map for a level comprising the vertical location and displaying the vertical location on a display device of the hand-held computing device.

9. The computer-implemented method of claim 8, wherein the beacon data is read from a beacon data dictionary.

10. The computer-implemented method of claim 8, wherein the generating the integer value representing an estimate of the expected level inside the structure based on a set of probabilities further comprises generating level weights sums from probabilities for beacons on each of a set of levels from which the items of beacon data been received.

11. The computer-implemented method of claim 8, wherein the generating the integer value representing an estimate of an expected level inside a structure based on the set of probabilities further comprises generating probabilities for beacons on each of a set of levels based on the items of beacon data time information.

12. The computer-implemented method of claim 8, further comprising iteratively updating the vertical location of the hand-held computing device using expectation estimates.

13. A hand-held computing device comprising:
  a processor;
  a memory coupled to the processor;
  a display device electrically coupled to the processor;
  a barometric pressure sensor electrically coupled to the processor;
  a wireless communication system electrically coupled to the processor, the wireless communication system configured to receive items of beacon data wirelessly from beacons external to the hand-held computing device; and
  wherein the memory stores a program that, when executed by the processor; causes the processor to:
    generate an estimate of expected vertical location based on the items of beacon data;
    generate an error covariance of the estimate of expected vertical location based on the items of beacon data;
    calculate a level normalized change based on measurements of barometric pressure by the barometric pressure sensor;
    calculate a vertical location of the hand-held computing device by generation of an integer value representing a level inside a structure based on a linear solution calculation having inputs comprising the level normalized change, the error covariance of the estimate of expected vertical location, and the estimate of expected vertical location; and
    display the vertical location on the display device.

14. A hand-held computing device comprising:
  a processor;
  a memory coupled to the processor;
  a display device electrically coupled to the processor;
  a barometric pressure sensor electrically coupled to the processor;
  a wireless communication system electrically coupled to the processor, the wireless communication system configured to receive items of beacon data wirelessly from beacons external to the hand-held computing device; and
  wherein the memory stores a program that, when executed by the processor; causes the processor to:
    generate an estimate of expected vertical location based on the items of beacon data by generation of an integer value representing an estimate of an expected level inside a structure based on a set of probabilities calculated at least in part from beacon data comprising beacon distances, beacon distance accuracies, and items of beacon data time information;
    generate an error covariance of the estimate of expected vertical location based on the items of beacon data;
    calculate a level normalized change based on measurements of barometric pressure by the barometric pressure sensor;
    calculate a vertical location of the hand-held computing device based on the level normalized change, the error covariance of the estimate of expected vertical location, and the estimate of expected vertical location; and
    display the vertical location on the display device.

15. A computer program product in a non-transitory computer-readable medium for location of a handheld computing device, the computer program product in a non-transitory computer-readable medium comprising instructions, which, when executed, cause a processor of handheld computing device to perform:
  generating an estimate of expected vertical location based on items of beacon data received from beacons by a radio receiver of the hand-held computing device;
  generating an error covariance of the estimate of expected vertical location based on the items of beacon data;
  calculating a level normalized change based on measurements of barometric pressure by a pressure sensor of the hand-held computing device;
  calculating the vertical location of the hand-held computing device by generating an integer value representing a level inside a structure based on a calculation having inputs comprising the level normalized change, the error covariance of the estimate of expected vertical location, and the estimate of expected vertical location; and
  displaying the vertical location on a display device of the hand-held computing device.

16. A computer program product in a non-transitory computer-readable medium for location of a handheld computing device, the computer program product in a non-transitory computer-readable medium comprising instructions, which, when executed, cause a processor of handheld computing device to perform:
  generating an estimate of expected vertical location by generating an integer value representing an estimate of an expected level inside a structure based on a set of probabilities calculated at least in part from beacon data comprising beacon distances, beacon distance accuracies, and items of beacon data time information;

generating an error covariance of the estimate of expected vertical location based on the items of beacon data;

calculating a level normalized change based on measurements of barometric pressure by a pressure sensor of the hand-held computing device;

calculating the vertical location of the hand-held computing device based on the level normalized change, the error covariance of the estimate of expected vertical location, and the estimate of expected vertical location; and displaying the vertical location on a display device of the hand-held computing device.

* * * * *